US012623963B2

(12) United States Patent
Brooks et al.

(10) Patent No.: US 12,623,963 B2
(45) Date of Patent: May 12, 2026

(54) USE OF A HYDRAULIC BINDER CONTAINING CALCIUM ALUMINATE FOR THE PRODUCTION OF A CONSTRUCTION MATERIAL

(71) Applicant: ARDEX Group GmbH, Witten (DE)

(72) Inventors: Stephen Alan Brooks, Suffolk (GB); Rüdiger Oberste-Padtberg, Wuppertal (DE); Jörg Sieksmeier, Essen (DE); Hubert Motzet, Rosendahl (DE); Michael Pomberg, Dortmund (DE)

(73) Assignee: ARDEX Group GmbH, Witten (DE)

( * ) Notice: Subject to any disclaimer, the term of this patent is extended or adjusted under 35 U.S.C. 154(b) by 947 days.

(21) Appl. No.: 17/612,358

(22) PCT Filed: Jun. 12, 2020

(86) PCT No.: PCT/EP2020/066303
§ 371 (c)(1),
(2) Date: Nov. 18, 2021

(87) PCT Pub. No.: WO2020/249729
PCT Pub. Date: Dec. 17, 2020

(65) Prior Publication Data
US 2022/0242788 A1 Aug. 4, 2022

(30) Foreign Application Priority Data

Jun. 12, 2019 (GB) ....................................... 1908383
Mar. 13, 2020 (GB) ....................................... 2003674

(51) Int. Cl.
*C04B 7/32* (2006.01)
*C01F 7/46* (2006.01)
(Continued)

(52) U.S. Cl.
CPC ................ *C04B 7/323* (2013.01); *C01F 7/46* (2013.01); *C02F 1/008* (2013.01); *C02F 11/06* (2013.01); *C02F 11/08* (2013.01); *C02F 11/123* (2013.01); *C02F 11/13* (2019.01); *C02F 11/145* (2019.01); *C04B 7/02* (2013.01); *C04B 7/24* (2013.01); *C04B 7/32* (2013.01); *C04B 7/40* (2013.01); *C04B 7/434* (2013.01); *C04B 7/4423* (2013.01); *C04B 7/51* (2013.01); *C04B 7/52* (2013.01); *C04B 7/525* (2013.01); *C04B 14/06* (2013.01); *C04B 14/28* (2013.01); *C04B 22/064* (2013.01); *C04B 22/143* (2013.01); *C04B 24/2611* (2013.01); *C04B 24/2641* (2013.01); *C04B 28/04* (2013.01); *C04B 28/06* (2013.01); *C04B 28/065* (2013.01); *C04B 28/14* (2013.01); *C04B 28/146* (2013.01); *C04B 28/147* (2013.01); *C04B 28/16* (2013.01); *F23G 5/0273* (2013.01); *F27B 7/08* (2013.01); *F27B 7/36* (2013.01); *C01P 2002/72* (2013.01); *C02F*

*2101/10* (2013.01); *C02F 2209/02* (2013.01); *C04B 2103/0068* (2013.01);
(Continued)

(58) Field of Classification Search
CPC ......... C04B 7/323; C04B 7/4423; C04B 7/51; C04B 7/52; C04B 7/02; C04B 7/24; C04B 28/06; C04B 28/146; C04B 28/147; C04B 7/32; C04B 14/06; C04B 14/28; C04B 24/2611; C04B 24/2641; C04B 28/065; C04B 28/14; C04B 7/40; C04B 7/434; C04B 7/525; C04B 28/16; C04B 28/04; C04B 22/064; C04B 22/143; C04B 2111/00637; C04B 2111/60; C04B 2111/00646; C04B 2103/0068; C02F 11/13; C02F 1/008; C02F 11/08; C02F 11/123; C02F 11/06; C02F 11/145; C02F 2101/10; C02F 2209/02; C01F 7/46; F23G 5/0273; F23G 2201/20; F27B 7/08; F27B 7/36; F27B 2007/005; Y02P 40/125; Y02P 40/121; Y02P 40/10; Y02W 10/37; Y02W 10/40; Y02W 30/91; C01P 2002/72
See application file for complete search history.

(56) References Cited

U.S. PATENT DOCUMENTS 3,565,646 A * 2/1971 Housh ..................... C04B 35/10
501/127
4,352,660 A 10/1982 Steiner et al.
(Continued)

FOREIGN PATENT DOCUMENTS

CN 1557714 A 12/2004
CN 1705622 A 12/2005
(Continued)

OTHER PUBLICATIONS

Dahhou et al., "Synthesis and Characterization of Drinking Water Treatment Plant Sludge-Incorporated Portland Cement", J Mater Cycles Waste Manag, 20, https://doi.org/10.1007/s10163-017-0650-0, 2018, pp. 891-901.*
(Continued)

*Primary Examiner* — Patrick D Niland
(74) *Attorney, Agent, or Firm* — Todd Esker; Bret E. Field; Bozicevic, Field & Francis LLP

(57) ABSTRACT

The invention relates to the use of a hydraulic binder containing calcium aluminate, obtainable by a method in which a) prepared amorphous residual material rich in aluminium oxide and/or aluminium hydroxide is heated after the addition of a b) calcium ion-containing binder component and c) water, for the production of a constructing material.

17 Claims, No Drawings

(51) Int. Cl.

| | |
|---|---|
| *C02F 1/00* | (2023.01) |
| *C02F 11/06* | (2006.01) |
| *C02F 11/08* | (2006.01) |
| *C02F 11/123* | (2019.01) |
| *C02F 11/13* | (2019.01) |
| *C02F 11/145* | (2019.01) |
| *C04B 7/02* | (2006.01) |
| *C04B 7/24* | (2006.01) |
| *C04B 7/40* | (2006.01) |
| *C04B 7/43* | (2006.01) |
| *C04B 7/44* | (2006.01) |
| *C04B 7/51* | (2006.01) |
| *C04B 7/52* | (2006.01) |
| *C04B 14/06* | (2006.01) |
| *C04B 14/28* | (2006.01) |
| *C04B 22/06* | (2006.01) |
| *C04B 22/14* | (2006.01) |
| *C04B 24/26* | (2006.01) |
| *C04B 28/04* | (2006.01) |
| *C04B 28/06* | (2006.01) |
| *C04B 28/14* | (2006.01) |
| *C04B 28/16* | (2006.01) |
| *F23G 5/027* | (2006.01) |
| *F27B 7/08* | (2006.01) |
| *F27B 7/36* | (2006.01) |
| *C02F 101/10* | (2006.01) |
| *C04B 103/00* | (2006.01) |
| *C04B 111/00* | (2006.01) |
| *C04B 111/60* | (2006.01) |
| *F27B 7/00* | (2006.01) |

(52) U.S. Cl.

CPC ............... *C04B 2111/00637* (2013.01); *C04B 2111/00646* (2013.01); *C04B 2111/60* (2013.01); *F23G 2201/20* (2013.01); *F27B 2007/005* (2013.01); *Y02P 40/10* (2015.11); *Y02P 40/121* (2015.11); *Y02P 40/125* (2015.11); *Y02W 10/37* (2015.05); *Y02W 10/40* (2015.05); *Y02W 30/91* (2015.05)

(56) References Cited

U.S. PATENT DOCUMENTS

| | | | |
|---|---|---|---|
| 4,671,497 A | 6/1987 | Schmitz et al. | |
| 5,108,510 A * | 4/1992 | Burge ....................... | C04B 7/30 106/819 |
| 2003/0056696 A1* | 3/2003 | Fenske .................... | C04B 28/02 106/737 |
| 2006/0048684 A1 | 3/2006 | Bonetto et al. | |
| 2006/0278131 A1 | 12/2006 | Hunt | |
| 2007/0193477 A1 | 8/2007 | Sawaki et al. | |
| 2012/0286190 A1* | 11/2012 | Prat ......................... | C04B 28/16 252/62 |
| 2018/0127315 A1* | 5/2018 | Brigandat ................ | C04B 28/06 |

FOREIGN PATENT DOCUMENTS

| | | | |
|---|---|---|---|
| CN | 1926074 A | 3/2007 | |
| CN | 1966449 A | 5/2007 | |
| CN | 105392754 A | 3/2016 | |
| EP | 2695850 A1 * | 4/2014 | ........... A61K 6/0606 |
| EP | 3505239 A1 | 7/2017 | |
| EP | 3983359 A1 | 4/2022 | |
| GB | 2401104 A | 11/2004 | |
| GB | 2401104 B | 8/2007 | |
| GB | 2586951 A | 3/2021 | |
| JP | S62-91300 A | 4/1987 | |
| JP | S63-95114 A | 4/1988 | |
| JP | H5-310453 A | 11/1993 | |
| JP | H05310453 A | 11/1993 | |
| JP | H6-15297 A | 1/1994 | |
| JP | H11-314098 A | 11/1999 | |
| JP | 2005-75712 A | 3/2005 | |
| JP | 2006-193387 A | 7/2006 | |
| KR | 2011-0091171 A | 8/2011 | |
| KR | 10-1336300 A | 12/2013 | |
| PT | 104535 B | 7/2011 | |
| RU | 2219129 C2 | 12/2003 | |
| RU | 2255916 C1 | 7/2005 | |
| RU | 2368578 C1 | 9/2009 | |
| RU | 2442759 C2 | 2/2012 | |
| RU | 2607632 C2 | 1/2017 | |
| SU | 1604772 A1 | 11/1990 | |
| WO | WO8804285 A1 | 6/1988 | |
| WO | WO9626900 A1 | 9/1996 | |
| WO | WO2019092360 A1 | 5/2019 | |
| WO | WO2020249739 A1 | 12/2020 | |

OTHER PUBLICATIONS

Author Unknown, Sodimate Bulletin "ACTIFLO Water Clarification Process" bulletin of Apr. 30, 2019, https://sodimate-inc.com/actiflo-water-clarification-process-microsand-pac/, 9 pages.*

Machine English translation of JP 1993-310453, Ikeda, Nov. 22, 1993.*

Office Action for U.S. Appl. No. 17/612,789 mailed Jan. 23, 2024, 12 pages.

Written Opinion for Singapore Application No. 11202112832X mailed on Nov. 27, 2023, 7 pages.

Written Opinion for Singapore Application No. 11202113036W mailed on Nov. 24, 2023, 7 pages.

Office Action and Search Report for Russian Patent Application No. 2021134529/03(072983), mailed Apr. 18, 2024, and its English translation, 20 pages.

Volzhenskiy et al., Mineral Binding Materials, Moscow, Stroyizdat, 1979, p. 436-438, 442, and its English translation, 8 pages.

Office Action for Japanese Patent Application No. 2021-571879, mailed Mar. 28, 2024, and its English translation, 8 pages.

Yoshioka et al., Development of the Environmental Clean-Up Material from Water-Purifying Sludge, 2009, 8 pages.

Office Action for Russian Application No. 2021134521/03 mailed on Jul. 11, 2023, with English translation, 16 pages.

Search Report for Russian Application No. 2021134521/03 mailed on Jul. 10, 2023, with English translation, 4 pages.

Dahhou et al., Alumina sludge's Influence on the physicochemical characteristics of CPJ55 cement, MATEC Web of Conferences 149, 01058, Jan. 2018.

Office Action for Russia Application No. 2021134155/03 mailed Jan. 30, 2024, with its English translation, 10 pages.

Office Action for Canadian Patent Application No. 3,141,434, mailed Jan. 12, 2024, 6 pages.

Office Action for Vietnamese Patent Application No. 1-2021-07698, mailed Jan. 31, 2024, and its English translation, 4 pages.

Office Action for Vietnamese Patent Application No. 1-2021-07697, mailed Jan. 31, 2024, and its English translation, 4 pages.

Office Action for European Application No. 20732866.7 mailed on Feb. 20, 2023, 4 pages.

Office Action for European Application No. 20732865.9 mailed on Feb. 22, 2023, 5 pages.

Office Action for GB Application No. GB1908383.1 mailed Jun. 8, 2022, 5 pages.

Office Action for Canada Application No. 3,140,520 mailed on Dec. 1, 2023, 4 pages.

First Office Action for Chinese Application No. 202080039721.7 mailed Aug. 2, 2022, with its English summary, 12 pages.

Rejection of the Decision for Chinese Application No. 202080038955.X mailed on Aug. 15, 2023 with its English Translation, 18 pages.

Office Action for Indonesian Application No. P00202110555 mailed on Aug. 2, 2023, with its English translation, 6 pages.

Office Action for Indonesian Application No. P00202110524 mailed on Aug. 4, 2023, with its English translation, 6 pages.

(56)                     References Cited

OTHER PUBLICATIONS

Office Action for Indonesian Application No. P00202110077 mailed on Aug. 22, 2023, with its English Translation, 6 pages.
Second Office Action for Chinese Application No. 202080038955.X mailed on Feb. 19, 2023, with its English translation, 26 pages.
Office Action for European Application No. 20732860.0 mailed on Feb. 20, 2023, with its English translation, 10 pages.
Zou, Technology and Principles of Materialized Utilization of Sludge, Heilongjiang University Press, May 2015, pp. 135-138.
Xu, Corundum Refractories, 2nd edition, Metallurgical Industry Press, Jun. 2007, pp. 283-285.
First Office Action for Chinese Application No. 202080039362.5 mailed Aug. 15, 2022, with its English translation, 25 pages.
Guo et al., Mineral Formation Mechanism of Calcium Sulphoaluminate Cement Clinker in Hydrothermal-Low Temperature Sintering Process, Journal of the Chinese Ceramic Society, Feb. 2018, vol. 46, No. 2; Abstract Only, 6 pages.
Office Action for China Application No. 202080039362.5 mailed on Apr. 29, 2023, English translation enclosed, 18 pages.
Office Action for Chinese Patent Application No. 202080039062.7, mailed Jun. 7, 2024, and its English translation, 26 pages.
Wang, Ion Exchange Technology in Pollution Control, Compiled by C. Calmon H. Gold, Sun Fangjiu Xianghua School, Atomic Energy Press, 1979, and its English translation, 12 pages.
Zou, Material Utilization Technology and Principles of Sludge, Heilongjiang University Press, May 2015, and its English translation, 11 pages.
Yoshioka et al., Development of the Environmental Clean-Up Material from Water-Purifying Sludge, Annual Report of the Mie Institute for Environmental Conservation, 2009, with machine translation, 17 pages.
Office Action for Russian Application No. 2021134155/03 mailed on Aug. 30, 2023, with its English Translation, 12 pages.
Search Report for Russian Application No. 2021134155/03 mailed on Aug. 30, 2023, with its English Translation, 4 pages.
Dahhou et al., Alumina sludge's Influence on the physicochemical characteristics of CPJ55 cement, MATEC Web of Conferences 149, 01058 (2018), 5 pages.
Office Action for European Application No. 20839233.2 mailed on Oct. 5, 2023, with its English Translation, 8 pages.
Office Action for India Application No. 202147057863 mailed on Dec. 19, 2023, 6 pages.
Office Action for Canada Application No. 3,141,396 mailed on Dec. 4, 2023, 5 pages.
First Office Action for Chinese Application No. 202080038955.X mailed Aug. 9, 2022, with its English summary, 16 pages.
Office Action for Chinese Application No. 202080039362.5 mailed on Nov. 27, 2023, with its English Translation, 19 pages.
Written Opinion for Singapore Application No. 11202112829T mailed on Nov. 27, 2023, 5 pages.
Office Action for Indonesia Application No. P00202110468 mailed on Jul. 11, 2023, with English translation, 5 pages.
Office Action for India Application No. 202147055857 mailed on Jul. 21, 2023, 6 pages.
Office Action for Russia Application No. 2021134694/03 mailed on Jun. 21, 2023, with English translation, 10 pages.
Search Report for Russia Application No. 2021134694/03 mailed on Jun. 20, 2023, with English translation, 4 pages.
Ahmad et al., Investigating calcined filter backwash solids as supplementary cementitious material for recycling in construction practices, Construction and Building Materials, vol. 175, Jun. 30, 2018, p. 664-671.
First Office Action for Chinese Application No. 202080039062.7 mailed on Sep. 15, 2023, with its English Translation, 26 pages.
Examination Report for GB Application No. 1908383.1 mailed on Sep. 22, 2023, 2 pages.
Examination Report for Indian Application No. 202147053288 mailed on Sep. 22, 2023, 7 pages.

Decision of Final Rejection for Chinese Application No. 202080039721.7 mailed on Sep. 28, 2023, with its English Translation, 29 pages.
Office Action for Japan Patent Application No. 2021-571876, mailed Mar. 5, 2024, and its English translation, 30 pages.
Office Action for Japan Patent Application No. 2021-571881, mailed Feb. 27, 2024, and its English translation, 9 pages.
Search Report for Malaysia Patent Application No. PI2021007015, mailed Apr. 18, 2024, 5 pages.
Substantive Examination Adverse Report for Malaysian Application No. PI2021006975 mailed on Dec. 14, 2023, 3 pages.
Examination Report for GB Application No. 1908383.1 mailed Feb. 10, 2023.
Chen et al., Reuse of water purification sludge as raw material in cement production, Cement & Concrete Composites 32 (2010) 436-439.
Examination Report for GB Application No. 2003674.5 mailed Oct. 28, 2022, 3 pages.
Office Action for Canada Application No. 3,140,133 mailed on Nov. 23, 2023, 5 pages.
Written Opinion for Singapore Application No. 11202113039U mailed on Nov. 24, 2023, 6 pages.
Substantive Examination for Russia Application No. 2021134521/03(072949) mailed on Dec. 6, 2023, with its English Translation, 8 pages.
Second Office Action for China Application No. 202080039721.7 mailed on May 11, 2023, English translation, 25 pages.
Office Action for United Kingdom Application No. GB1908383.1 mailed on May 25, 2023, 3 pages.
Office Action for Chinese Patent Application No. 202080039362.5, mailed Oct. 18, 2024, and its English translation, 20 pages.
Guo et al., Mineral Formation Mechanism of Calcium Sulphoaluminate Cement Clinker in Hydrothermal-Low Temperature Sintering Process, Journal of the Chinese Ceramic Society, Feb. 2018, vol. 46, No. 2, 12 pages.
Office Action for European Patent Application No. 20 732 865.9, mailed Jan. 14, 2025, 5 pages.
Elangovan et al., Reuse of alum sludge in clay brick manufacturing, Water Science & Technology: Water Supply, 2011, vol. 11, No. 3, p. 333-341.
Office Action for corresponding Indian Patent Application No. 202147057863, mailed Feb. 13, 2025, 2 pages.
Office Action for European Patent Application No. 20 732 860.0, mailed Nov. 13, 2024, and its English translation, 10 pages.
EPA, Emerging Technologies for Biosolids Management, Sep. 2006, EPA 832-R-06-005, Retrieved from the Internet: https://www.epa.gov/sites/default/files/2018-11/documents/emerging-tech-biosolids-management.pdf, on May 27, 2025, 135 pages.
Feeco, Rotary Kilns, Feeco International Product Brochure, Archived May 16, 2017, Retrieved from the Internet: https://web.archive.org/web/20170516235512/http://go.feeco.com/acton/attachment/12345/f-0074/1/-/-/-/FEECO-Rotary-Kilns.pdf, on May 27, 2025, 10 pages.
Nijland et al., Chapter 8: Microscopic Examination of Deteriorated Concrete, in vol. 1: Non-Destructive Evaluation of Reinforced Concrete Structures, Woodhead Publishing Series in Civil and Structural Engineering, 2010, p. 137-179.
Nazari et al., Development of a Metallurgical Process for Eramet's Mabounie Nb-REE Project, In: Davis et al., Extraction 2018, The Minerals, Metals & Materials Series, 2018, https:doi.org/10.1007/978-3-319-95022-8_198, 17 pages.
O'Looney et al., A Study of the Functionality of Hydrated Lime as an Admixture, J. Mat. Sci. Res. 2015, vol. 4, No. 1, p. 1-11.
Turner et al., Potential Alternative Reuse Pathways for Water Treatment Residuals: Remaining Barriers and Questions—a Review, Water Air Soil Pollut 230, 227, 2019, https://doi.org/10.1007/s11270-019-4272-0, 30 pages.
Woodard & Curran, Inc., Chapter 9: Solid Waste Treatment and Disposal, in Industrial Waste Treatment Handbook, 2 ed., Butterworth-Heinemann, 2006, https://doi.org/10.1016/B978-075067963-3/50011-4, p. 363-408.
Burris et al., Management of Water Treatment Plant Residuals, Advances in Water and Wastewater Treatment, 2004, American

(56) References Cited

OTHER PUBLICATIONS

Society of Civil Engineers (ASCE), Retrieved from: https://app.knovel.com/hotlink/pdf/id:kt00A7S5T7/advances-in-water-wastewater/mechanical-dewatering, 40 pages.
Lee et al., Beneficial Uses of Sludge from Water Purification Plants in Concrete Mix, Env. Sci. Eng., 2012, vol. 29, No. 4, p. 284-289.
Babatunde et al., Characterization of aluminum-based water treatment residual for potential phosphorus removal in engineered wetlands, Environmental Pollution, 2009, vol. 157, p. 2830-2836.
Dahhou et al., Structural aspects and thermal degradation kinetics of water treatment plant sludge of Moroccan capital, Waste Biomass Valor, 2016, vol. 7, p. 1177-1187.

* cited by examiner

USE OF A HYDRAULIC BINDER CONTAINING CALCIUM ALUMINATE FOR THE PRODUCTION OF A CONSTRUCTION MATERIAL

The present invention relates to the use of a binder containing calcium aluminate for the production of a construction material.

Driven by government investments, the construction industry has seen a steady increase in incoming orders in recent years and now accounts for a significant share of the manufacturing sector. With regard to the achievement of climate policy goals, which have recently come increasingly into focus, the construction industry is therefore also increasingly required to pursue environmentally friendly and sustainable concepts. For this reason, the concept of sustainable construction has been established for some time, which pursues various approaches to carrying out construction measures while preserving the ecosystem and the environment.

With regard to possible starting points, the factors that drive climate change most strongly are of particular interest. In addition to the necessarily high demand for fossil fuels in the construction industry, it is above all the high demand for constructing materials that significantly promotes climate change. In contrast to methods for reducing the demand for fossil fuels, the development of sustainable constructing materials still needs to be developed.

For example, the production of currently known hydraulic binders or constructing materials is often still associated with a considerable use of natural resources and a high energy input. The durability of known hydraulic binders or of constructing materials produced from known hydraulic binders is also often in need of optimisation.

It is therefore the object of the present invention to at least partially overcome the aforementioned disadvantages of known products and systems used for the production of a constructing material. In particular, it is the object of the invention to provide a sustainable and environmentally friendly way of producing a versatile constructing material which can be produced simply and inexpensively.

The foregoing object is solved by a use having the features of the independent claim for use. Further features and details of the invention result from the respective dependent claims and the description.

Use of a hydraulic binder containing calcium aluminate for the production of a constructing material is provided according to the invention, wherein the hydraulic binder containing calcium aluminate is obtainable by a method in which a) a prepared amorphous residual material rich in aluminium oxide and/or aluminium hydroxide is heated after addition of a b) calcium ion-containing binder component and c) water.

In the context of the invention, a hydraulic binder is preferably understood to be a material which, after being mixed with water, independently solidifies and hardens as a result of chemical reactions with the mixing water and, after hardening, also remains solid and dimensionally stable under water. According to the invention, a residual material is understood to mean in particular a residue produced in a method for which no reuse is intended and which therefore has to be disposed of, sometimes in a time-consuming and cost-intensive manner. In the context of the invention, processing can be understood in particular as a form of treatment comprising, for example, collection, filtering, drying, comminution or the like. In the context of the invention, an alumina-rich and/or alumina-hydroxide-rich residual material is understood in particular as a material having an alumina content or an alumina-hydroxide content (the sum of the alumina or alumina-hydroxide) of at least 5 wt. %, preferably of at least 30 wt. %, in-particular of at least 50 wt. %-relative to the dry content of the material. It is understood here that the material may also be formed substantially in the form of only one of the two components.

It should be noted at this point in advance of the following explanations that, with respect to the indication of preferred proportions by weight of the components within a mixture, the person skilled in the art is quite capable of combining the ranges in such a way that the total proportion of all components of the mixture is 100 wt. %.

In the context of the present invention, it has been recognized that, in particular, by using a processed amorphous residual material rich in aluminum oxide and/or aluminum hydroxide, it is possible to produce in a simple and inexpensive manner a hydraulic binder which can be used in a variety of ways and at the same time makes a contribution to sustainable construction, the contribution in the present case being made in particular by conserving natural resources by using residual or waste materials for the production of the hydraulic binder, which would otherwise have to be disposed of in an elaborate and cost-intensive manner.

With regard to a simple processability as well as a high water retention capacity of the hydraulic binder, it can be provided in an objectively advantageous manner that the prepared amorphous residual material rich in aluminium oxide and/or aluminium hydroxide has a degree of crystallization of less than 25 wt. %, preferably of less than 20 wt. %, in particular of less than 15 wt. %. The degree of crystallization is intended here to serve as a measure of the amorphous character of a material, the properties being antiproportional to one another. The degree of crystallization can be measured here, for example, by spectroscopic methods, DSC measurements or X-ray diffraction experiments.

With regard to a particularly simple, efficient and inexpensive possibility of using processed alumina-rich and/or alumina-hydroxide-rich residues, it can be advantageously provided according to the invention that the processed alumina-rich and/or alumina-hydroxide-rich residue is formed at least partially, preferably completely, in the form of drinking water treatment residues. Drinking water treatment residues have in this case in particular high aluminium oxide and/or aluminium hydroxide contents and are significantly less expensive to purify than other residues, such as for example waste water treatment residues or the like, in particular because they are less contaminated with pollutants. Due to the different contents of drinking water and wastewater, these (drinking water/wastewater) are not directly comparable.

In the context of a production of a mineral-based constructing material, it is further advantageous if the processed alumina-rich and/or alumina-hydroxide-rich residue is substantially free of organic material. As used herein, organic material means material comprising carbon compounds and not belonging to any of the following compound types: elemental carbon, anhydrous chalcogenides, carbonic acid, carbonates, carbides, cyanides, cyanates and thiocyanates. Substantially free means a residual content of preferably less than 2 wt. %, more preferably less than 0.5 wt. %, more preferably less than 0.1 wt. %.

In order to enable fast and simple processing of the hydraulic binder containing calcium aluminate, it may advantageously further be provided that the prepared alumina-rich and/or aluminum hydroxide-rich residual material is substantially anhydrous. Essentially anhydrous here means a water content of preferably less than 5% by weight, more preferably less than 2 wt. %, in particular less than 0.5 wt. %.

With regard to easy processability and a high water retention capacity of the hydraulic binder containing calcium aluminate, it can also be advantageously provided that the prepared alumina-rich and/or aluminum hydroxide-rich residual material has a particle size of less than 100 μm, preferably of less than 50 μm, in particular of less than 40 μm.

In the context of the highest possible cost savings and sustainability, it can also be advantageously provided in accordance with the invention that the processed residual material rich in aluminium oxide and/or aluminium hydroxide is used in a proportion of 0.5—65 wt. %, preferably in a proportion of 1—55 wt. %, in particular in a proportion of 2—45 wt. %, based on the total dry mass of the constructing material, or is contained in the constructing material.

With regard to ensuring immediate usability of the present processed alumina-rich and/or alumina-hydroxide-rich residual material, it may further be provided that the material is temperature-pretreated, for example by being pre-treated at a temperature of less than 700° C., preferably of less than 650° C., more preferably at a temperature between 650° C. and 350° C., in particular at a temperature between 400° C. and 500° C. Similarly, the residual material may be air-flow pre-treated or pre-dewatered.

With regard to the production of a constructing material with the shortest possible processing time, it can be provided in particular that an ettringite former, preferably a calcium-containing and/or sulfate-containing ettringite former, is added for the production of the constructing material. In this case, the ettringite former can be used in particular in a proportion of 20-70% by weight relative to the dry weight of the constructing material. Preferably, the ettringite former can be formed in the form of calcium aluminate, calcium sulfoaluminate cement, sodium aluminate, alumina cement, aluminium sulphate, aluminium hydroxide or mixtures thereof.

With regard to high strength, rapid processability and variable adjustability of properties of the constructing material, the addition of Portland cement and/or hydrated lime and/or calcium oxide and/or calcium sulphate may be provided for the production of the constructing material according to the invention. Likewise, pozzolans, lime or similar substances may be added.

In order to achieve a constructing material with the shortest possible setting times, rapid setting combined with high early strength and shrinkage compensation, the constructing material may advantageously comprise a ternary binder, the ternary binder preferably comprising alumina cement, Portland cement and a sulphate carrier.

In this case, the ternary binder advantageously has a proportion of 20-70 wt. % of alumina cement, 10-40 wt. % of sulphate carrier and 0.2-20 wt. % of Portland cement, based on the total mass of the ternary binder.

In order to be able to ideally adjust the setting times of the constructing material, the sulfate carrier may preferably be-formed in the form of alpha calcium sulfate hemihydrate, beta calcium sulfate hemihydrate, anhydrite, calcium sulfate dihydrate or mixtures thereof.

In order to improve the adjustability of the mechanical and processing properties of the constructing material, the constructing material can advantageously comprise a filler, wherein the filler can preferably be added in the constructing material in a proportion of 10-90 wt. %, particularly preferably in a proportion of 20-80 wt. %, in particular in a proportion of 30-70 wt. % relative to the total dry mass of the constructing material. It should be noted that with respect to the indication of preferred ranges of a plurality of components, the skilled person is well able to combine the ranges in such a way that the total proportion of all components is 100%.

Here, the filler may preferably have a particle size of less than 2 mm, more preferably of less than 1 mm, in particular a particle size of 10-500 μm. In addition, the filler may be in the form of different variants, such as, for example, limestone powder, quartz sand, marble, chalk, clay, marl, talc or light fillers, such as hollow microspheres made of glass, ceramic or plastic or light fillers, such as expanded glass, expanded mica, expanded perlite, expanded slate, expanded clay, coal fly ash, brick chippings, natural pumice, tuff, lava, slag pumice, boiler sand or a mixture thereof.

For further preferably tailor-made adjustability of the properties of the constructing material, the addition of additives can be provided for the production of the constructing material, wherein the additives can preferably be added in a proportion of 0.001-10 wt. %, particularly preferably in a proportion of 0.005-5 wt. %, in particular in a proportion of 0.01-2.5 wt. %, based on the total dry mass of the constructing material.

With regard to a particularly diverse adjustability of the properties of the constructing material, the additives may be formed, for example, in the form of liquefiers, retarders, accelerators, actuators, stabilizers, defoamers or sealants. The liquefiers may preferably be present in the constructing material in an amount of from 0.001 to 5 wt. %, and are preferably provided to reduce the amount of water required during mixing of the constructing material, as well as to provide high early strength development. The plasticizers or the superplasticizers or leveling agents may in this case be formed in particular in the form of modified plasticizers based on polycarboxylate ethers, on melamine sulfonate, on casein or on saturated or unsaturated mono- or dicarboxylic acid derivatives or on oxyalkylene glycol alkenyl ethers and/or esters. The retarders may further preferably be present at a level of from 0.001 to 2 wt. % in the constructing material and advantageously be formed in the form of tartaric acid, citric acid or one or more of the salts thereof. The accelerators may further preferably be formed in the form of setting accelerators and may be present, for example, in a proportion of 0.001 to 2 wt. % in the constructing material. In particular, the accelerators may be based on alkali carbonates, such as $LiCO_3$ or the like. The stabilizing agents may further advantageously be present in the constructing material in a proportion of 0.001 to 2 wt. % and may be formed, for example, in the form of heteropolysacharides, cellulose, cellulose derivatives, such as hydroxycellulose or the like. The defoamers may further be present, for example, at a level of 0.001 to 1 wt. % in the constructing material. In addition to the additives mentioned, other additives, such as thickeners, color pigments, reducing agents, air-entraining agents, processing aids, hydrophobing agents, wetting agents, biocides, fungicides, algicides or flame retardants or the like may also be present in the constructing material.

With regard to the production of a rapidly hardening, water-impermeable, tensile-bending and pressure-resistant constructing material, it can be further provided that the addition of an epoxy resin and an epoxy hardener is provided for the production of the constructing material, wherein the epoxy resin and the epoxy hardener can be added in total preferably in a proportion of 10-60 wt. % relative to the total dry mass of the constructing material.

In order, in particular, to improve the adhesion, flexibility and processability of the constructing material, it can also be provided that the constructing material comprises a plastic dispersion powder, the plastic dispersion powder preferably being present in the constructing material in a proportion of 0.1-20 wt. %, particularly preferably in a proportion of 0.5-10 wt. %, in particular in a proportion of 1 to 5 wt. %, based on the total dry mass of the constructing material.

The plastic dispersion powder may in this case be based, for example, on vinyl or acrylate polymers, in particular on a polyvinyl acetate, a polyvinyl versatate, a polystyrene acrylate, a polyacrylate, a polyvinyl alcohol, a polyvinyl propionate, a polyvinyl chloride, a polyethylene, a polypropylene, a butyl acrylate or a mixture thereof.

In order to improve the resistance of the constructing material to deformation, in particular to bending and tensile stress, it is further conceivable that the addition of a fibrous material is provided for the production of the constructing material, the fibrous material preferably being added in a proportion of 0.01-5 wt. %, particularly preferably in a proportion of 0.1-3 wt. %, in particular in a proportion of 1-2 wt. %, based on the total dry mass of the constructing material.

With regard to effectively improving resistance to deformation, it is also conceivable that the fibrous material comprises fibres of a length of up to 2 mm, preferably of up to 3 mm, in particular of up to 5 mm.

With regard to easy miscibility and processability of the constructing material, it can be advantageously provided in accordance with the invention that the constructing material is formed in the form of a screed, a mortar, a compound or a tile adhesive. In this regard, the constructing materials may be particularly suitable for laying natural stones, bricks, tiles, slabs or other covering materials, such as mats, wooden flooring, parquet, carpet, laminate and the like. The screed may further be formed as a cement screed or a synthetic resin screed and may be applied in the form of a flowing or dry screed. The mortar may also be formed in the form of a cement-based mortar or a synthetic resin mortar, and may be in the form of a grout or thin-bed mortar. The compounds may further be formed, for example, in the form of a floor, wall or ceiling filler, whereas the tile adhesive may also be formed as a floor or wall tile adhesive and may be cement-based or synthetic resin-based.

Further advantages, features and details of the invention will be apparent from the following description, in which embodiments of the invention are described in detail. The features mentioned in the claims and in the description may be essential to the invention individually or in any combination.

EXAMPLES OF EMBODIMENTS

Some exemplary formulations (dry compositions) for constructing materials according to the invention are given below, which can be prepared starting from the use of the hydraulic binder containing calcium aluminate according to the invention (hydraulic binder I) with the addition of the further components listed. The corresponding "ready-to-use" constructing material can then be produced from these proposed dry compositions by adding water. The proportion of water in this case can preferably be 10-150 wt. % relative to the total dry mass of the constructing materials. The designation "hydraulic binder I" is intended to distinguish the hydraulic binder containing calcium aluminate according to the invention in particular from other hydraulic binders, such as Portland cement or alumina cement.

Tile Adhesive:
    Hydraulic binder I: 30 wt. %
    Portland cement: 15 wt. %
    Sand: 51.6 wt.-%
    Accelerator: 1 wt. %
    Cellulose ether: 0.5 wt. %
    Dispersible powder: 1.8 wt. %
    Fibrous material: 0.1 wt. %
Putty:
    Hydraulic binder I: 16.5 wt. %
    Portland cement: 5.5 wt. %
    Alumina cement: 5 wt. %
    $CaSO_4$-$\alpha$-hemihydrate: 9 wt. %
    Sand: 26 wt. %
    Limestone powder: 24 wt. %
    Lightweight aggregates: 10 wt. %
    Dispersible powder: 3 wt. %
    Casein: 0.2 wt. %
    Condenser: 0.5 wt. %
    Stabilizer: 0.02 wt. %
    Retardant: 0.07 wt. %
Screed:
    Hydraulic binder I: 11.6 wt. %
    Alumina cement: 4 wt. %
    Portland cement: 10.4 wt. %
    $CaSO_4$-$\alpha$-hemihydrate: 11 wt. %
    Sand: 62 wt. %
    Superplasticizer: 0.05 wt. %
    Setting accelerator: 0.15 wt. %
    Retardant: 0.1 wt. %
Synthetic Resin Mortar:
    Hydraulic binder I: 29.2 wt. %
    Synthetic resin: 30 wt. %
    Hardener: 3.3 wt. %
    $CaSO_4$-$\alpha$-hemihydrate: 14.6 wt. %
    Alumina cement: 17.3 wt. %
    Portland cement: 4.8 wt. %
    Setting accelerator: 0.4 wt. %
    Retardant: 0.26 wt. %

The constructing materials according to the invention listed in the embodiments are not only versatile in use and simple and inexpensive to produce, but also simultaneously make a contribution to sustainable construction, which is provided in particular by the fact that resources are conserved for the production of the constructing materials by using residual or waste materials for production, which would otherwise have to be disposed of in an elaborate and cost-intensive manner.

The invention claimed is:

1. A method for producing a hydraulic binder containing calcium aluminate and not containing Portland cement, comprising heating a processed amorphous alumina-rich or alumina-hydroxide-rich residue after addition of a calcium ion-containing binder component and water wherein the processed amorphous alumina-rich or alumina-hydroxide-rich residue is formed in the form of a drinking water treatment residue, wherein the amount of the sum of alumina and alumina-hydroxide of the residue in relation to the dry content is >50 wt.-%.

2. The method according to claim 1, wherein the processed amorphous alumina-rich or alumina-hydroxide-rich residue has a degree of crystallization of less than 25%.

3. The method according to claim 1, wherein in that the hydraulic binder containing calcium aluminate has a residual proportion of organic material.

4. The method according to claim 1, wherein the hydraulic binder containing calcium aluminate is substantially anhydrous.

5. The method according to claim 1, wherein the hydraulic binder containing calcium aluminate has a particle size of less than 100 μm.

6. The method according to claim 1, wherein the hydraulic binder containing calcium aluminate is formed in the form of a constructing material.

7. The method according to claim 6, wherein the constructing material further comprises an ettringite former.

8. The method according to claim 6, wherein the constructing material further comprises a filler.

9. The method according to claim 8, wherein the filler is formed in the form of limestone powder, quartz sand, marble, chalk, clay, marl, or talc filler.

10. The method according to claim 6, wherein the constructing material further comprises additives.

11. The method according to claim 10, wherein the additives are in the form of liquefiers, retarders, accelerators, actuators, stabilizers, defoamers or sealants.

12. The method according to claim 6, wherein the constructing material further comprises an epoxy resin and an epoxy hardener.

13. The method according to claim 6, wherein the constructing material further comprises plastic dispersion powder.

14. The method according to claim 13, wherein the plastic dispersion powder is formed on the basis of vinyl or acrylate polymers.

15. The method according to claim 6, wherein the constructing material further comprises a fibrous material.

16. The method according to claim 15, wherein the fibrous material has fibres of a length of up to 2 mm.

17. The method according to claim 6, wherein the constructing material is formed in the form of a screed, mortar, filler or tile adhesive.

* * * * *